(12) United States Patent
Briscoe et al.

(10) Patent No.: US 8,797,887 B2
(45) Date of Patent: Aug. 5, 2014

(54) TREATMENT OF DATA IN NETWORKS

(75) Inventors: Robert J Briscoe, Suffolk (GB); Arnaud Jacquet, Suffolk (GB); Andrea Soppera, Suffolk (GB); Sebastien Cazalet, Le Bar sur Loup (FR)

(73) Assignee: BRITISH TELECOMMUNICATIONS plc, London (GB)

( * ) Notice: Subject to any disclaimer, the term of this patent is extended or adjusted under 35 U.S.C. 154(b) by 1097 days.

(21) Appl. No.: 10/593,442

(22) PCT Filed: Mar. 30, 2005

(86) PCT No.: PCT/GB2005/001250
§ 371 (c)(1),
(2), (4) Date: Sep. 19, 2006

(87) PCT Pub. No.: WO2005/096567
PCT Pub. Date: Oct. 13, 2005

(65) Prior Publication Data
US 2008/0240115 A1      Oct. 2, 2008

(30) Foreign Application Priority Data
Mar. 30, 2004 (GB) .................................. 0407144.5

(51) Int. Cl.
*H04L 12/26* (2006.01)
*H04L 12/28* (2006.01)
*H04J 3/00* (2006.01)

(52) U.S. Cl.
USPC ........... 370/252; 370/254; 370/351; 370/464; 370/912

(58) Field of Classification Search
CPC ............ H04L 12/2414; H04L 12/2634; H04L 12/1489
USPC ................................................. 370/238, 400
See application file for complete search history.

(56) References Cited

U.S. PATENT DOCUMENTS

| | | | |
|---|---|---|---|
| 6,192,404 B1 | 2/2001 | Hurst et al. | |
| 6,608,833 B2 | 8/2003 | Katsube | |
| 6,633,538 B1 | 10/2003 | Tanaka | |
| 6,661,806 B1 * | 12/2003 | Eriksson et al. | ............... 370/468 |

(Continued)

FOREIGN PATENT DOCUMENTS

| | | |
|---|---|---|
| EP | 1187401 | 3/2002 |
| EP | 1 730 908 B1 | 10/2012 |

(Continued)

OTHER PUBLICATIONS

Office Action dated Jul. 13, 2009, in U.S. Appl. No. 10/593,423.

(Continued)

*Primary Examiner* — Omar Ghowrwal
(74) *Attorney, Agent, or Firm* — Nixon & Vanderhye PC

(57) ABSTRACT

Data networks, nodes making up parts of data networks, and information are related to the characterization of paths taken by data travelling between nodes in the networks. Path characterization information is arranged to be conveyed to nodes such that it may be used by nodes subsequently forwarding data. In particular, the invention relates to nodes receiving such path characterization information from upstream nodes, deriving therefrom information indicative of characteristics of a path downstream of said nodes, and using such information to make informed decisions such as routing decisions when forwarding data onward in data networks.

14 Claims, 7 Drawing Sheets

Routing using Path Characterisation Information

(56) References Cited

U.S. PATENT DOCUMENTS

| | | | |
|---|---|---|---|
| 6,693,896 B1* | 2/2004 | Utsumi et al. | 370/352 |
| 6,778,502 B2 | 8/2004 | Ricciulli | |
| 7,233,574 B2 | 6/2007 | Worfolk | |
| 7,433,311 B1 | 10/2008 | Kalyanasundaram | |
| 8,391,152 B2 | 3/2013 | Briscoe et al. | |
| 2001/0025310 A1* | 9/2001 | Krishnamurthy et al. | 709/223 |
| 2001/0055290 A1* | 12/2001 | Seidel et al. | 370/337 |
| 2002/0018449 A1 | 2/2002 | Ricciulli | |
| 2003/0009594 A1 | 1/2003 | McElligott | |
| 2003/0056007 A1 | 3/2003 | Katsube et al. | |
| 2003/0128687 A1 | 7/2003 | Worfolk et al. | |
| 2003/0189901 A1 | 10/2003 | Ozugur | |
| 2003/0202469 A1* | 10/2003 | Cain | 370/230 |
| 2004/0146007 A1* | 7/2004 | Saadawi et al. | 370/238 |

FOREIGN PATENT DOCUMENTS

| | | | | |
|---|---|---|---|---|
| GB | 0407144.5 | * | 10/2005 | H04L 12/56 |
| WO | 99/23799 | | 5/1999 | |
| WO | WO 99/23799 | | 5/1999 | |
| WO | WO 03/088615 A2 | | 10/2003 | |

OTHER PUBLICATIONS

UK Search Report dated Aug. 18, 2004.
International Search Report dated Jun. 13, 2005.
UK Search Report dated Sep. 17, 2004.
Ganesh et al., "Congestion Pricing and User Adaptation", Proceedings IEEE Infocom 2001. The Conference on Computer Communications, 20$^{th}$ Annual Joint Conference of the IEEE Computer and Communications Societies, Anchorage, AK, Apr. 22-26, 2001, Proceedings IEEE Infocom. The Conference on Computer Communi, vol. 1 of 3, pp. 959-965.
RCE, Amendment Under 37 C.F.R. § 1.114(c) and Form PTO/SB/08a filed Jul. 19, 2010, in response to the Final Office Action mailed Feb. 18, 2010, in U.S. Appl. No. 10/593,423.
Stoica, et al., "Chord, A Scalable Peer-to-Peer Lookup Service for Internet Applications," Proc. ACM SIGCOMM'01, Computer Communication Review 31 (4) pp. 149-160 (Oct. 2001) http://pdos.csail.mit.edu/papers/chord:sigcomm0l/chord_sigcomm.pdf.
Ratnasamy, et al.,"A Scalable Content-Addressable Network," (CAN) Proc. ACM SIGCOMM'01, Computer Communication Review 31 (4) pp. 161-172 (Oct. 2001) http://conferences.sigcomm.org/sigcomm/2001/p13-ratnasamy.pdf.
Rowstron, et al., "Pastry: Scalable, Decentralized Object Location and Routing for Large-Scale Peer-to Peer Systems," IFIP/ACM International Conference on Distributed Systems Platforms (Middleware), pp. 329-350 (Nov. 2001) http://www.cs.unibo.it/~babaoglu/courses/cas12-13/resources/tutorials/pastry.pdf.
RFC 791, Internet Protocol, DARPA Internet Program Protocol Specification, Defense Advanced Research Projects Agency, Information Processing Techniques Office, Information Sciences Institute, University of Southern California, 49 pages (Sep. 1981) (IPv4) http://tools.ietf.org/pdf/rfc791.pdf.
RFC 2460, Internet Protocol, Version 6 (IPv6), Specification, 39 pages (Dec. 1998) http://tools.ietf.org/pdf/rfc2460.pdf.
RFC 792, Internet Control Message Protocol, DARPA Internet Program Protocol Specification, 21 pages (Sep. 1981) http://tools.ietf.org/pdf/rfc792.pdf.
RFC 793, Transmission Control Protocol, DARPA Internet Program Protocol Specification, 89 pages (Sep. 1981) http://tools.ieft.org/pdf/rfc793,pdf.
RFC 768, User Datagram Protocol, 3 pages (Aug. 1980) http://tools.ietf.org/pdf/rfc768.pdf.
RFC 1058, Routing Information Protocol, 33 pages (Jun. 1988) http://tools.ietf.org/pdf/rfc1058.pdf.
Kimura et al., "Evaluation of Evaluation of DiffServ-aware constraint-based routing schemes for multiprotocol label switching networks", Networks 2002, ICON 2002, 10$^{th}$ IEEE International Conference on Aug. 27-30, 2002, pp. 181-185, XP010603616.
Wei Sun, "QoS Policy Constraint Based Routing", Dec. 1999, http://wwwl.cse.wustl.edu/~jain/cis788-99/ftp/qos_routing/index.html, XP002288847.
European Official Action issued for European Patent Application No. 05729774.9, dated Nov. 4, 2010.
Response filed May 16, 2011, to EPO Communication under Article 94(3) dated Nov. 4, 2010, issued in corresponding EP Application No. 05 729 774.9-1525.
Bonsma, Proc. Of the 6th World Multi Conf. on Systemics, Cybernetics and Informatics (SCI2002),"Fully Decentralised, Scalable Look-up in a Network of Peers using Small World Networks," 6 pages (Jul. 2002).

* cited by examiner

|  | 0 - 3 | 4 - 7 | 8 - 15 | 16-18 | 19 - 31 |
|---|---|---|---|---|---|
| 0 | Version | Header Length | Type of Service (now DiffServ and ECN) | Total Length | |
| 32 | Identification | | | Flags | Fragment Offset |
| 64 | Time to Live | | Protocol | Header Checksum | |
| 96 | Source Address | | | | |
| 128 | Destination Address | | | | |
| 160 | Options | | | | |
| 192 | Data | | | | |

Figure 1: Header Format according to IPv4
(PRIOR ART)

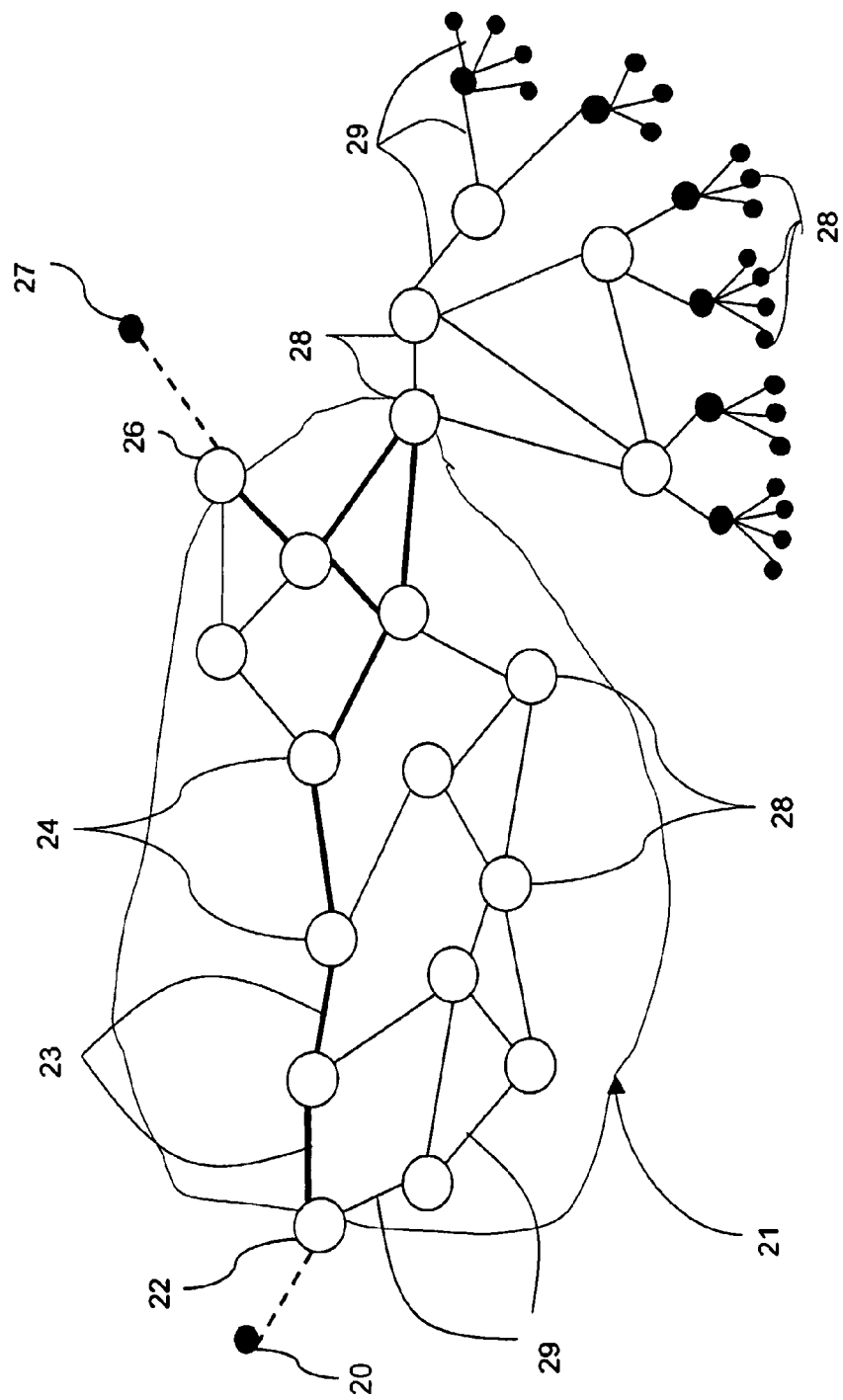
Figure 2: Representation of a Network

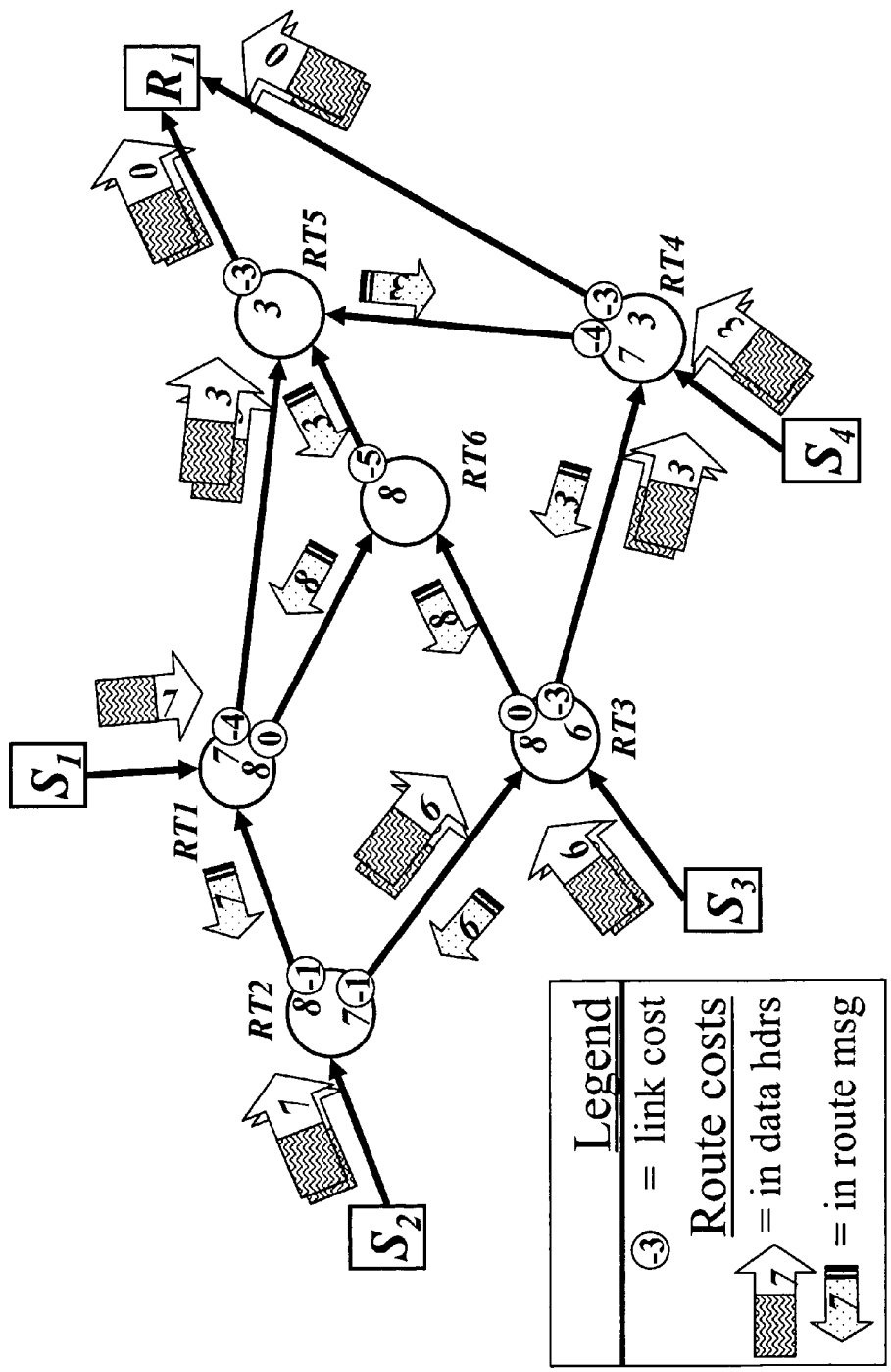
Figure 3: Routing using Path Characterisation Information

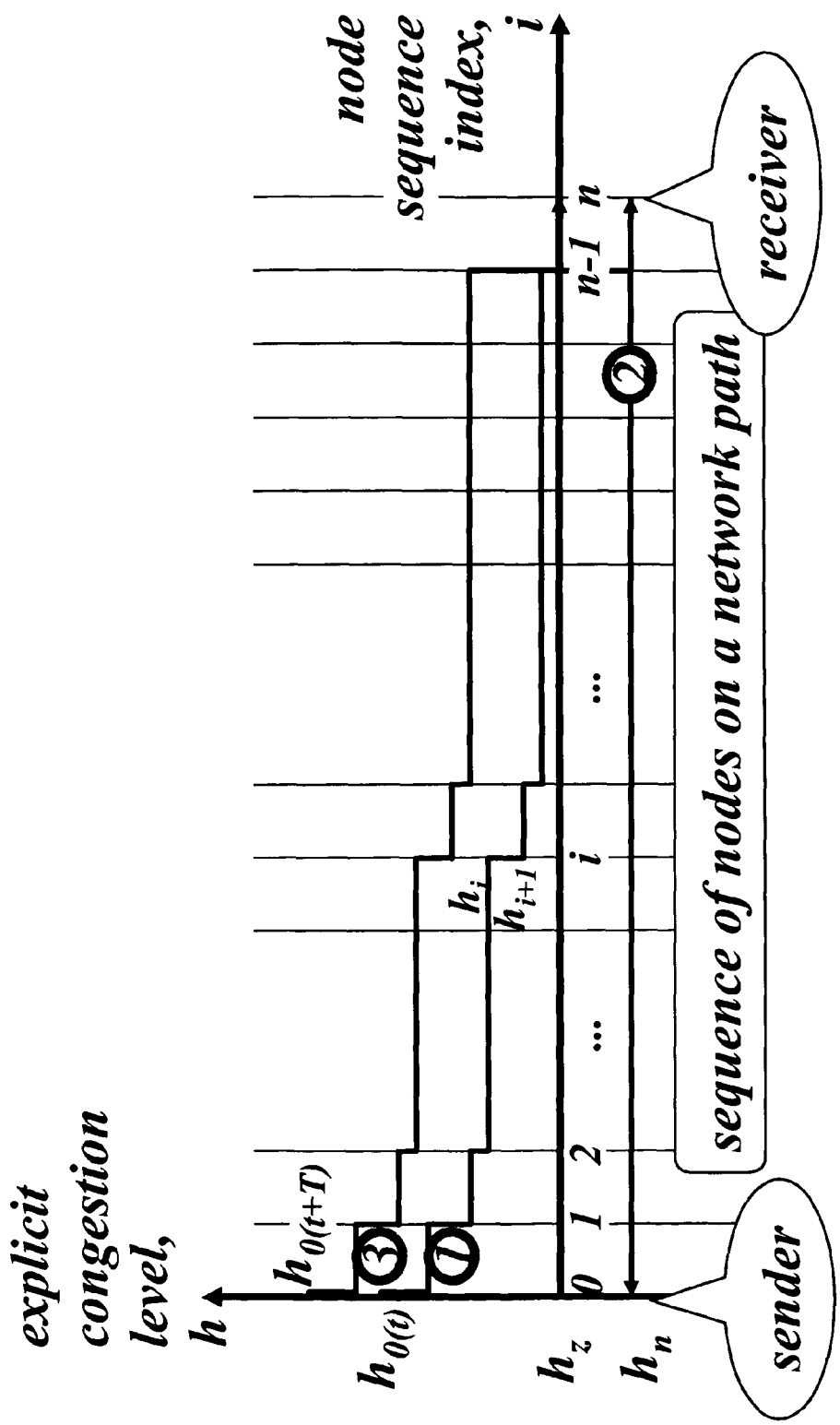
Figure 4: Use of Explicit Congestion Level (ECL)

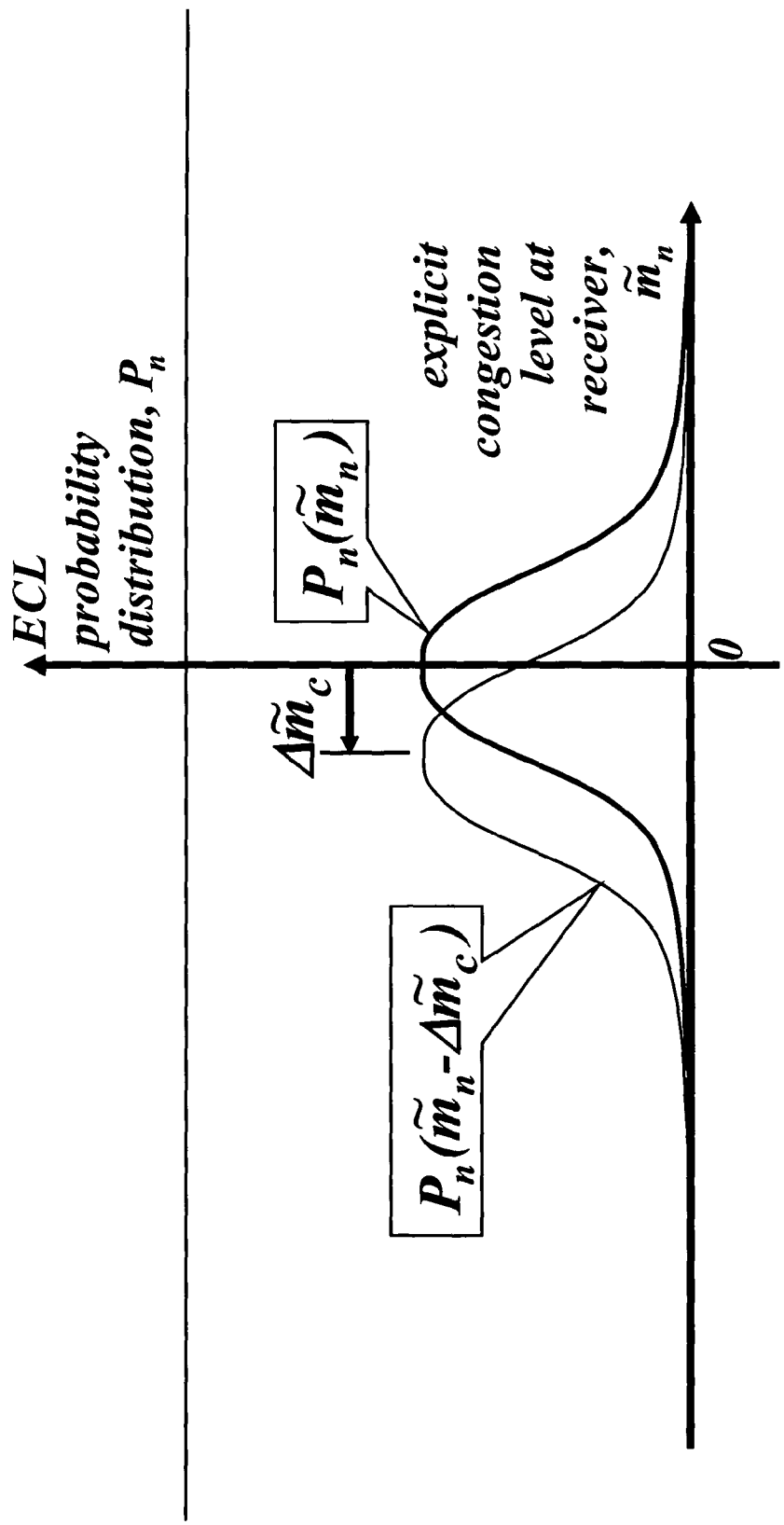
Figure 5: Effect of Cheating on Probability Distribution

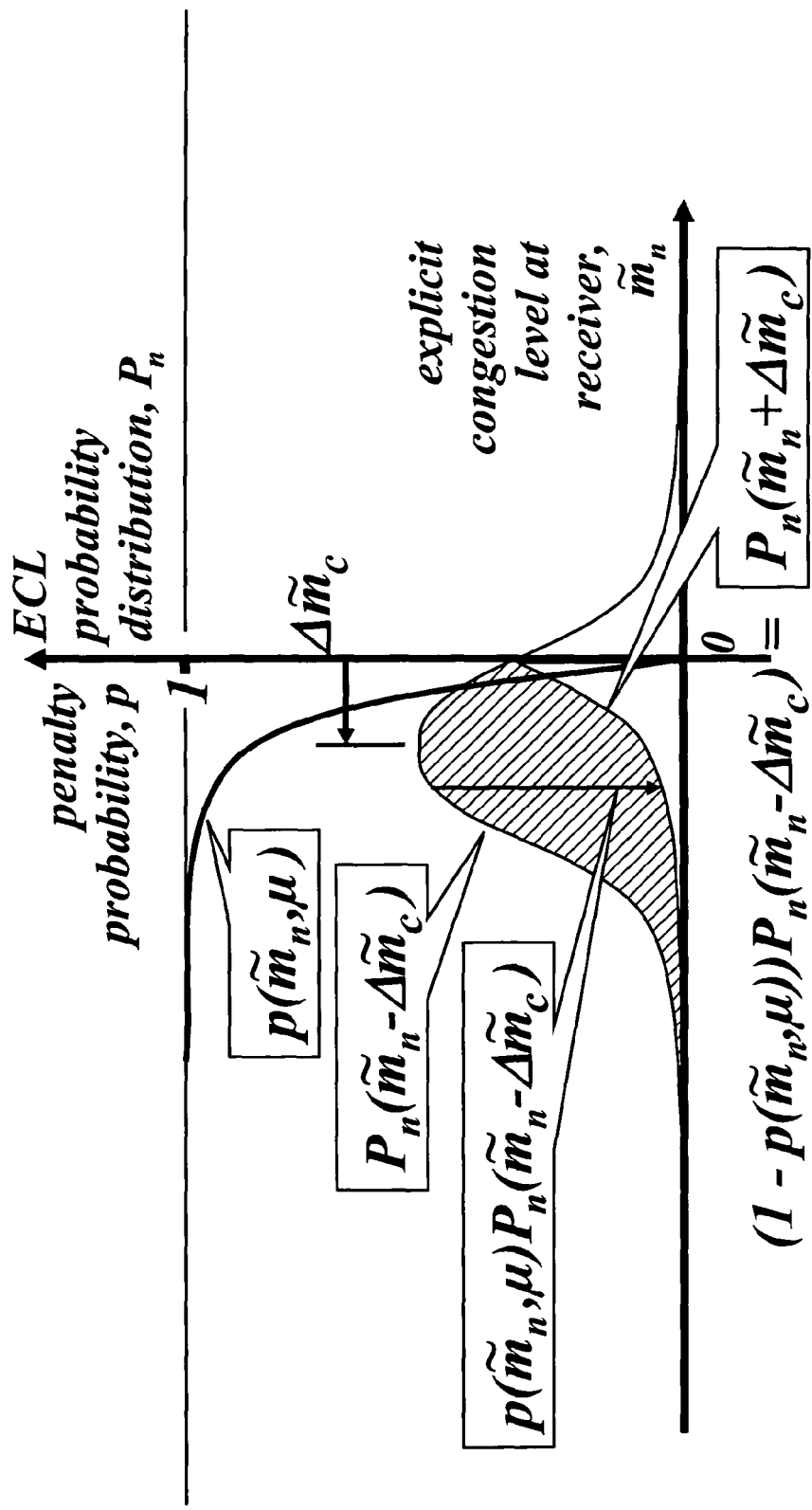
Figure 6: Penalising Misbehaviour with Uncertainty

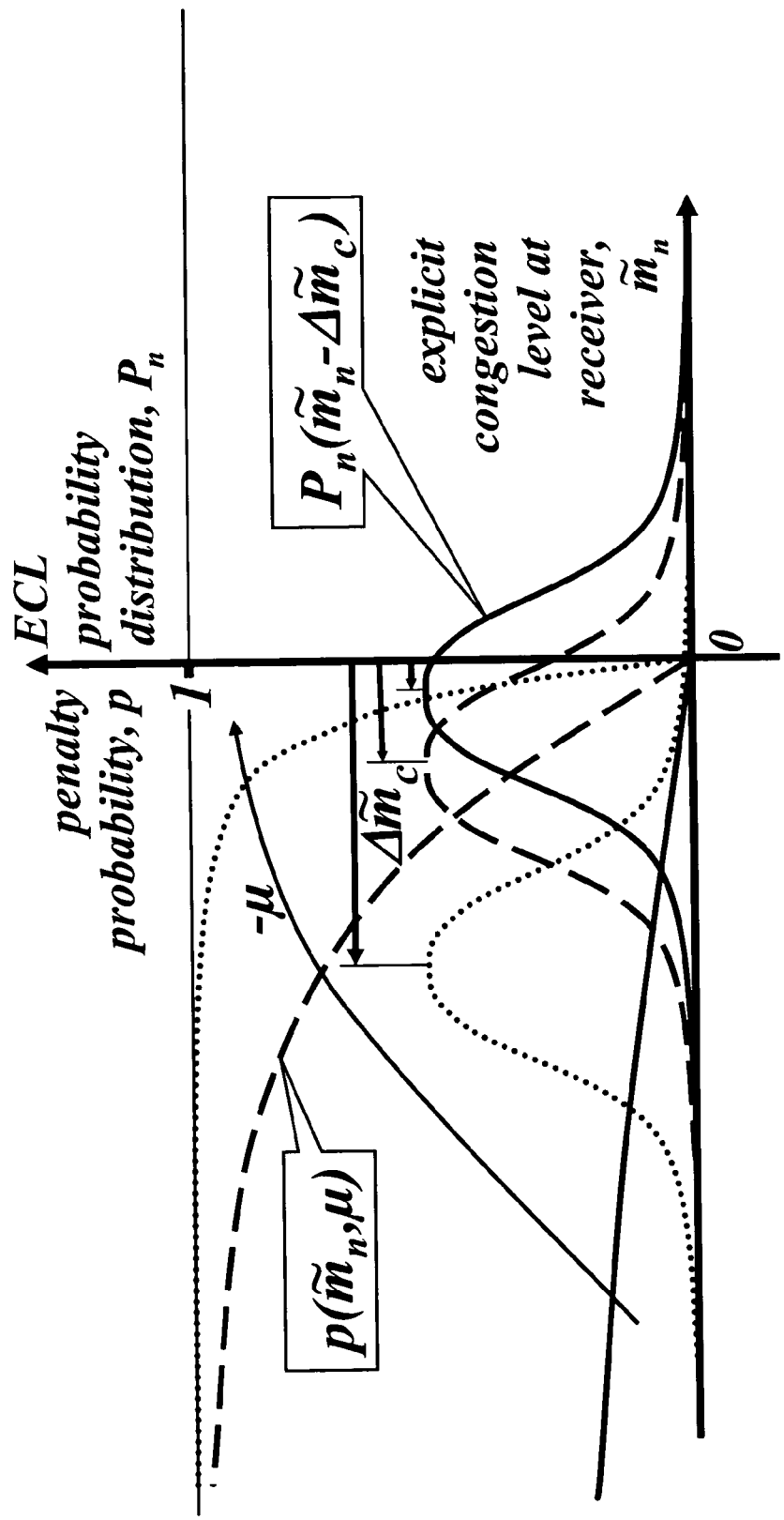
Figure 7: Dependence of Penalty Function on Recent History

TREATMENT OF DATA IN NETWORKS

This application is the US national phase of international application PCT/GB2005/001250 filed 30 Mar. 2005 which designated the U.S. and claims benefit of GB 0407144.5, dated 30 Mar. 2004, the entire content of which is hereby incorporated by reference.

BACKGROUND

1. Technical Field

The present invention relates to networks, for example data networks such as the Internet, and to the treatment of data in networks. It relates to ad hoc networks and to fixed networks, to networks which may be parts of other larger networks, to bounded networks such as an intranet, and to unbounded networks such as the Internet. It relates to networks for conveying information or other resources which may be in digital or analogue form, and which may be in packet or non-packet form. A co-pending International patent application claiming priority from the same UK patent application GB 04 07 144.5 has also been filed, relating to methods and systems for providing information, or for contributing towards the provision of information, which may be used for characterising paths through networks, and to the use of this information. Aspects of the present invention relate to the use of such information in relation to the treatment of data being forwarded through a network, and particularly to the routing of data and other items through networks, and to establishing the presence of capabilities along paths through networks, in relation to charging, priority, quality of service and congestion issues for users of networks.

2. Related Art

Data in a network such as the Internet is generally sent from a source to a destination in blocks which are usually referred to as packets or datagrams, these terms generally being used interchangeably. In order to allow communication, via the Internet, between source points and destination points irrespective of whether or not they have previously communicated, a protocol known as an Internet Protocol (IP) is used. This is a data-oriented protocol used by source and destination hosts, or servers, for communicating data across a packet-switched network in order to ensure that no specific set-up process is needed before a host acting for a source tries to send packets to a host acting for the intended destination or destinations, irrespective of whether or not they have previously communicated, and irrespective of the type of data that is being communicated. Internet Protocol is a protocol relating to how certain types of information may be included in a specific manner in a "header" associated with the packets. It precedes the data in the packets, and allows them to be routed from source to the correct destination via the Internet.

Internet Protocol Headers

With reference to FIG. 1, headers associated with datagrams according to the current version of the Internet Protocol, known as IPv4, comprise a first 4-bit field indicating this version. The second field is a 4-bit "Internet Header Length" (IHL) field indicating the number of 32-bit words in the IPv4 header. The following 8 bits have been allocated to a "Differentiated Services" field containing the 6 bit Differentiated Services Code Point (DSCP) and the 2 bit "ECN" (Explicit Congestion Notification) field. The DSCP allows it to be specified how the datagram should be handled as it makes its way through the network (i.e. low delay, high priority etc.). The ECN field is set probabilistically at a congested resource so that, over a series of packets, the destination can infer the level of congestion of the path traversed. The next 16-bit IPv4 field defines the entire datagram size, including header and data, in 8-bit bytes. The minimum-length datagram is 20 bytes and the maximum is 65535.

The next field is a 16-bit "Identification" field. This field has primarily been used for unique identification of fragments of an original IP datagram. It has been suggested that this field could be used for other purposes, such as for adding packet-tracing information to datagrams. A 3-bit "Flags" field follows which is used to control or identify fragments. This is followed by a 13-bit "Fragment Offset Field" which allows a receiver to determine the position of a particular fragment in the original IP datagram.

The next filed is an 8-bit "Time-To-Live" (TTL) field, which aims to prevent datagrams from persisting (e.g. going around in loops) within a network. Historically the TTL field limited a datagram's lifetime in seconds, but it has come to be a "hop count" field, with some attempt to maintain the original meaning by hops across large distances making themselves appear as multiple hops. The value may initially set at 255. Each packet switch (or router) that the datagram crosses decrements the TTL field by one (or maybe more at interfaces to long distance links). If the TTL field hits zero before reaching its intended destination, the packet is no longer forwarded by a packet switch and is thus discarded.

An 8-bit Protocol field follows. This field defines the next protocol used in the data portion of the IP datagram. The Internet Assigned Numbers Authority maintains a list of Protocol numbers. Common protocols include ICMP, TCP and UDP.

The following field in an IPv4 datagram header is a 16-bit "Checksum" field. Some values in an IPv4 datagram header may change at each packet switch hop, so the checksum may need to be adjusted on its way through a network. The checksum is followed by 32-bit "Source Address" and 32-bit "Destination Address" fields, respectively.

Additional header fields (called "Options") may follow the destination address field, but these are not often used.

Reliability in a Network

It should be noted that the Internet Protocol itself does not provide or guarantee a reliable datagram service, but a "best effort" service—it makes almost no guarantee that packets will reach their destination. Packets may arrive damaged, out of order, duplicated, or may be dropped entirely. In order to provide reliability in a network, there may also be a "Transport" layer. This is responsible for end-to-end error recovery and flow control, and aims to ensure complete data transfer, although this again cannot be guaranteed for any of a variety of reasons relating to capacity, infrastructure problems, abuse etc. In the IP protocol Stack this function is achieved by the connection oriented Transmission Control Protocol (TCP). Alternatively a basic datagram service can be provided by the User Datagram Protocol (UDP).

Routing in a Network

Between source points and destination points in a network, there are generally multiple intermediate points, some of which may be active, in the sense that they may take a role in the decision-making regarding the route by which data they receive is forwarded on towards the destination. In the context of the Internet, these may be known as packet switches, or Internet routers. Other intermediate points may be passive, in the sense that they take no part in this decision-making—data may simply pass via them on its way through the network. Intermediate points that are "active" in the above sense may look at information in or associated with the data, in particular the destination address, in order to determine the subsequent path, or at least the next leg of the path, that the data should take in order to proceed towards its destination. In addition to such decision-making in respect of a specific item of data, intermediate points may communicate continuously with each other in order to share information about network conditions. Typically this information concerns the number of hops to each destination network and may include other information such as policies concerning whether one network wishes to offer routing transit to another. Intermediate points may also continuously share information about more pathological network conditions, such as infrastructure problems, congestion levels and delays occurring at different areas within the network. It should be noted that "areas" in the context of a network need not be areas in the geographical, or even the sense of a physically interconnected set of nodes—they may be areas of connectivity in a virtual network overlaid on the real physical links, which simply have a function to perform or a service to provide, much as the Internet is a network of virtual links overlaid on lower layer physical links.

Routing decisions may be taken in order to balance the load across different areas of a network, or to route data around a problem area. In addition to this, if the network is being run on a commercial basis, with charges being made for services provided, routing decisions may be taken in order to find the cheapest, fastest, or most reliable route through the network. In relation to this, various schemes, such as "congestion charging" schemes, operate or have been proposed for determining how such charges could or should be levied, but there are significant problems in setting up a system which is workable and fair, not least because for a data packet to leave a sender and reach its destination, it may need to pass through parts of one or more networks which may be of a variety of different types (i.e. fixed, ad hoc etc.). These may extend through several different countries or via satellites, be under the control of different entities, or conform to a variety of different sets of rules, both technical and legal. For a charging scheme to operate successfully in such circumstances, it may need to be able to operate irrespective of levels of trust between entities, and may need to be resistant to abuse or dishonest behaviour by any entities involved.

Charging schemes based on the Explicit Congestion Notification (ECN) field have been proposed. If the ECN capability is enabled by the sender (after negotiation with the receiver) the 2-bit ECN field is initialised to a binary value of either 01 or 10 (which are considered equivalent for the purposes of congestion control). The ECN field may be set to binary 11 (congestion experienced—CE) by any router through which a data packet passes, depending probabilistically on the levels of congestion currently being experienced by that router. When the data reaches its destination, the relative proportion of packets set to CE may provide an indication to the receiver of the overall level of congestion on the path by which the data passed through the network. This may be interpreted as a "cost" associated with the delivery of data via that particular path, which may be allocated to the receiving entity, the sending entity, or one or more other entities. Irrespective of whether any entity truly pays any consideration, the information available to the receiver may be of use in allowing routing decisions to be taken. It will be noted however that for any other entity to take any action or decision based on the final value, they generally need to be able to rely on the receiving entity to have passed on correct information.

In the literature that is supportive of using congestion charging of the above type, the problem of only the receiver being able to pay congestion charges or rely directly on information based on Explicit Congestion Notification data has generally been dismissed by arguing that arrangements between sender and receiver are a separate problem. This problem has been used as an argument against congestion charging, but no attempts at solving this problem are apparent in the literature.

BRIEF SUMMARY

The sender in a network such as datagram network can be thought of as being active, whereas the receiver may be passive, in the following sense. A node capable of sending items of data may be able to control what it sends, where it tries to send them, and how often it sends them, but it has very little control over what, from where or how often it receives datagrams. On the other hand, a sender is generally in the worst natural position to know about the network it is sending data into, while a node receiving data may at least have the benefit of being able to receive information characterising the path taken by arriving data (path congestion, hops traversed etc). In this regard, the sender can be thought of as having control without knowledge, whereas the receiver has knowledge without control. A receiver thus needs to provide feedback to the sender in respect of the path knowledge it learns, in order to carry path knowledge to where the control is. This is how the Internet currently works. Herein lie two problems:

(i) if the receiver has no incentive to feed back the information, and to feed it back honestly, it may well not do so;

(ii) intermediate nodes are both receivers and senders (in the sense that forwarding is simply sending something that has been received), but end to end feedback only conveys path knowledge to the first sender on the path, and does not convey path knowledge to every intermediate sender. Although the Internet is based on the end-to-end principle, where intermediate nodes are not expected to exercise intelligent control, they are often expected to make intelligent forwarding decisions based on routing information, which essentially should comprise knowledge of the downstream path. They may also be expected to make decisions on the rate at which they forward different classes of data, which would also ideally be informed by downstream path knowledge.

As will be explained in more detail later, embodiments of the present invention and of a related invention to which the above-mentioned co-pending International application relates allow for solutions to be provided, amongst others, to one or both of two general problems, which can be regarded as separate but related. These problems can be summarised as follows:

1) How to arrange for the provision of information to nodes characterising the downstream path from those node; and 2) How to proof this information from falsification.

The invention to which the above-mentioned co-pending International application relates will be briefly summarised before the subject matter of the present invention is specifically referred to.

According to the initially filed claims of this co-pending application, there is provided a data network comprising a provider node, a receiver node, and a plurality of intermediate nodes, the provider node being arranged to provide data to at least one of said intermediate nodes or to the receiver node, said intermediate nodes being arranged to receive data and forward data to at least one other intermediate node or to the receiver node, and the receiver node being arranged to receive data from at least one intermediate node or from the provider node; wherein:

said data comprises at least a part which relates to a path characterization metric;

said provider node is arranged to assign an initial condition to the path characterization metric in respect of data provided by it;

said intermediate nodes are arranged to update the condition of the path characterization metric in respect of data they forward;

said receiver node is arranged to make available for the provider node information indicative of a discrepancy between the condition of the path characterization metric in respect of data received by it and a predetermined target condition for the path characterization metric; and wherein said provider node is arranged to assign a different initial condition to the path characterization metric in respect of subsequent data provided by it in the event that it receives information indicative of such a discrepancy from said receiver node.

Closely related to the above, the initially filed claims of this co-pending application also relate to a feedback node for enabling an initial condition to be assigned to a path characterization metric in respect of data to be forwarded through a data network, said data network comprising a provider node, a receiver node and a plurality of intermediate nodes, said data comprising at least a part which relates to a path characterization metric; said provider node being arranged to assign an initial condition to the path characterization metric in respect of data, and to provide said data to at least one of said intermediate nodes or to the receiver node; said intermediate nodes being arranged to receive data from said provider node or from one or more other intermediate nodes, to update a condition of the path characterization metric in respect of data received by them, and to forward data to at least one other intermediate node or to the receiver node; and said receiver node being arranged to receive data from at least one intermediate node or from the provider node, and to make available for the feedback node information relating to the path characterization metric in respect of data received by it; wherein the feedback node is arranged to enable a different initial condition to be assigned to the path characterization metric in respect of subsequent data provided by the provider node in the event that said feedback node receives information indicative of a discrepancy between a predetermined target condition for the path characterization metric and the condition of the path characterization metric in respect of previous data received by said receiver node.

In general, it will be understood that the variable "condition" and the "predetermined target condition" for a path characterization metric will usually be values, examples of which are provided in detail below. It is foreseeable, however, that certain embodiments of the invention may instead use types of conditions that are not themselves values, such as, for example, the amplitude or phase of an optical signal in an optical network.

Embodiments of the above may allow the following to be achieved:

1) Provision of path characterization information to nodes in a network, said information relating to any of a variety of possible characteristics of the path or paths downstream of the node in question. To achieve this, there may be no need for upstream traffic beyond that being fed back end-to-end from a destination of data to the appropriate source. This is particularly useful where routes are asymmetric, particularly where it is not possible to send data upstream over certain unidirectional links (e.g. satellite links). But it is also useful if the available capacity can be increased by removing the overhead of routing information.

2) Ensuring that information such as the above may be proofed against falsification for the gain of an individual controlling any intermediate or end node.

Embodiments of the invention apply naturally to a network of datagram or packet networks (the Internet or optical packet networks), but there are a variety of other possible application areas.

It will be evident that while the path characterization metric may in effect "travel" through the network with the item of data to which it relates, for example, in the header of a data packet, according to a new version of an Internet Protocol, for example, this is not necessarily the case. A path through a data network may be no more than a virtual data channel, and there is no need to restrict the "location" of any path characterization information (to the extent that information has a location at all) to being within that channel. For instance, many network technologies separate control information from the data to which it refers. Control information, such as that characterizing paths, is carried in separate messages using separate protocols, that refer to the relevant data channel that they characterize. Sometimes control information is even carried on separate physical links between control equipment that is distinct from data forwarding equipment. More commonly, control information is carried in separate virtual circuits over the same physical links. For this reason, variants of the invention as set out above may perform the path characterization steps remote from the network, rather than within the network.

This is explained in more detail in the co-pending application.

It will be noted that information corresponding to that which can be made available to intermediate nodes according to the above method, which allows for information relating to the downstream path to be deduced, can also be made available without assigning a different initial condition to further path characterization metrics provided that information relating to the difference between the eventual condition of a previous path characterization metric and said predetermined target condition is made available to the intermediate node in addition to information indicative of the updated condition of further path characterization metrics. Using these two pieces of information, information relating to the downstream path can similarly be deduced in respect of a particular intermediate node.

This is also explained in more detail in the co-pending application.

It will be noted that while it has been necessary to define the invention of the co-pending application in a variety of ways, there is a unifying concept between all of the definitions, in that all of them allow for information to be made available for use in relation to decision-making in relation to a node, such information relating to characteristics of a previously-used path downstream of that particular node, but without the need for the passing of information upstream other than that from a receiver node to a provider node. All of them require that the provider node re-inserts information it has learned from feedback concerning its recently used path back into the network for further intermediate nodes to forward as control information about the data, whether the control information is carried in the headers of data packets or in separate control messages.

With reference to all of the above aspects, it should be noted that in the context of this invention, a "network" need not be the whole of an intranet, or the Internet, or any particular bounded or unbounded network. For the purposes of this invention, a "network" may be a part of another larger network. Similarly, a "provider node" need not be a node responsible for originating any data. It may itself be providing data in the sense that it is forwarding data received from elsewhere. The features by virtue of which a "provider node" differs from another node may simply be those set out in the above statements of invention. Likewise, a "receiver node" need not be the intended final destination for the data. The path from a "provider node", to a "receiver node" via any intermediate nodes may only be a sub-section of the total path from the originating source of the data to its intended final destination.

In this regard, embodiments of the present invention apply as much to data flows tunneled between two tunnel end-points as to the data within the tunnel and its end-points, as long as there can be a flow of feedback between the tunnel end-points.

The invention of the present application relates to the treatment of data, such as the routing of data in a data network. Path characterization information such as that derived according to methods referred to above is capable of being used by intermediate nodes in a network when making routing or other decisions. Such decisions may be based on more directly relevant, useful and up-to-date information than has previously been possible, provided that such intermediate nodes are capable of deriving appropriate information from the path characterization information they receive.

Thus, according to the present exemplary embodiment, there is provided an intermediate node for controlling the treatment of data in a data network, the data network comprising said intermediate node, at least one upstream node, and a plurality of downstream nodes, the or one of the upstream nodes being arranged to provide data to said intermediate node, the or one of the upstream nodes being arranged to provide path characterization information to said intermediate node, and said downstream nodes being arranged to receive data via paths downstream from the intermediate node; said intermediate node comprising:
   means for receiving data from an upstream node;
   means for receiving path characterization information from an upstream node, and for deriving therefrom information indicative of a characteristic of a path downstream of said intermediate node;
   means arranged to select, in dependence on said information indicative of said characteristic of a downstream path, a preferred manner of treatment for data to be forwarded on a downstream path; and
   means for forwarding data to a downstream node according to said preferred manner.

Corresponding to this, there is also provided a method for controlling the treatment of data to be forwarded from an intermediate node in a data network, the data network comprising said intermediate node, at least one upstream node, and a plurality of downstream nodes, the or one of the upstream nodes being arranged to provide data to said intermediate node, the or one of the upstream nodes being arranged to provide path characterization information to said intermediate node, and said downstream nodes being arranged to receive data via paths downstream from the intermediate node; said method comprising the steps of:
   receiving data from an upstream node;
   receiving path characterization information from an upstream node, and deriving therefrom information indicative of a characteristic of a path downstream of said intermediate node;
   selecting, on the basis of said information indicative of said characteristic of a downstream path, a preferred manner of treatment for data to be forwarded on a downstream path; and
   forwarding data to a downstream node according to said preferred manner.

The preferred manner of treatment for data to be forwarded on a downstream path may simply relate to the selection of a preferred downstream path for the data (i.e. the method of controlling the treatment of the data relates to the onward routing of data), or a preferred node to which the data is to be forwarded. It may however relate to selection between different types of treatment or service on the same path. Examples of other types of treatment which may allow one or more different types of levels of treatment to be selected include the following:
   (i) traffic engineering;
   (ii) route advert verification;
   (iii) contract verification;
   (iv) differentiated service gateways.

In general, embodiments of the present invention are described with reference to data networks; however, it will be noted that some embodiments of the invention may be applicable to other forms of network, such as workflow routing, electricity generation or even transport networks such as railway networks. However, the principle advantages of the invention are more evident in situations where it is problematic to provide immediate feedback for each message or event against the normal flow in the network along each link in order to keep each node in the network informed of the state of affairs downstream. Where the network carries non-information items (work, electrical current, cars, etc.), often it is not natural to be able to carry feedback backward along every link of the network, because feedback is often pure information, which the network is not designed to carry. However, it may be sufficiently cost effective to arrange for items flowing forwards through the network to carry information even if they are not pure information themselves (e.g. cars), and for communications links to be strategically placed across inputs and outputs of the network to allow feedback to be returned to relevant inputs and re-inserted into the network. In cases such as these, embodiments of the invention might prove useful on a hop-by-hop basis back to the source. Given work-flows arrive much more slowly than packets, it may well be more efficient to send information directly back to the source of a workflow after each step of the process, than to piggy-back the information only on work-flows flowing forwards through the system. The distinguishing feature is that the "atoms" of messaging dealt with by a work-flow routing system are much larger than feedback to the source needs to be. This is a reason why feedback provided according to embodiments of the invention is particularly useful in a data network such as a packet network. It is advantageous to try to avoid sending feedback as often in the upstream direction as data is being sent in the downstream direction.

Nonetheless, it will be apparent that embodiments of the invention could also be applied to connection-oriented networks with connections consisting of cells, frames or packets (e.g. ATM, Frame Relay, SDH, etc.). It could be applied to control of future all-optical packet networks, which are hard to design because of the inability to buffer light packets arriving simultaneously at a switch so that they may be served sequentially. Although light cannot be stored without converting it to electrical information, it can be slowed down. Feedback provided according to embodiments of the invention could provide a mechanism to slow it down before it arrived at a contended switch output, as the inability to store light means the slow-down must be instigated in advance of it being needed, not once the light arrives at the output. Feedback provided according to embodiments of the invention is wholly applicable to routed overlay networks on the current Internet, such as those created in a peer-to-peer fashion like CAN, PASTRY, Chord and SWAN, described in the following publications:

Chord: see "Chord: A Scalable Peer-to-Peer Lookup Service for Internet Applications", Hari Balakrishnan, M. Frans Kaashoek, David Karger, Robert Morris and Ion Stoica, Proc. ACM SIGCOMM'01, Computer Communication Review 31 (4) pp. 149-160 (October 2001);

SWAN: see "Fully Decentralised, Scalable Look-Up in a Network of Peers Using Small World Networks", Erwin Bonsma; "Proc. Of the 6th World Multi Conf. On Systemics, Cybernetics and Informatics (SCI2002)", pp. 147-152 (July, 2002);

CAN: see "A Scalable Content-Addressable Network", Sylvia Ratnasamy, Paul Francis, Mark Handley, Richard Karp and Scott Shenker, Proc. ACM SIGCOMM'01, Computer Communication Review 31 (4) pp. 161-172 (October 2001); and PASTRY: see "Pastry: Scalable, Distributed Object Location and Routing for Large-Scale Peer-to-Peer Systems", Antony Rowstron and Peter Druschel, IFIP/ACM "International Conference on Distributed Systems Platforms (Middleware)", pp. 329-350 (November 2001).

BRIEF DESCRIPTION OF THE DRAWINGS

FIG. 1 is a table showing fields in the headers associated with data according to the current version of the Internet Protocol, IPv4;

FIG. 2 is a topological representation showing pertinent features of a network;

FIG. 3 shows a simplified representation of a network for the purposes of explaining how routing decisions may be made;

FIG. 4 is a graph illustrating the use of a path characterization metric based on an Explicit Congestion Level (ECL);

FIGS. 5, 6 and 7 are graphs indicating the use of and effects of using dropping algorithms.

DETAILED DESCRIPTION OF EXEMPLARY EMBODIMENTS

With reference to FIG. 2, there is shown a topological representation of certain features of a communication network. This figure will be referred to in order to describe an exemplary network 21 according to an embodiment of the invention, but it should be noted that the invention is applicable to a variety of different categories of communication networks, such as fixed, mobile, ad hoc, and other types, and to networks themselves containing a variety of different categories of communication channels. As shown in FIG. 2, the network 21 may in fact be a sub-part of a wider network such as the Internet itself. The network 21 comprises a plurality of nodes 22, 24, 26, 28 each of which may serve to fulfill one or more of the following roles in relation to a particular attempt to communicate data from one location to another: providing data, forwarding data, and receiving data; or they may not be involved. As those in the art will recognize, a node in a communication network will include at least one configurable data processor coupled with suitable memory and input/output circuits. At different times, or concurrently but in relation to different attempts to communicate data, or in relation to attempts to communicate data between alternative locations, nodes may of course take different roles. There may thus be no difference between the different types of node other than their function at a particular time. For the purposes of explaining this embodiment, however, the network 21 will be described in terms of comprising a provider node 22, a receiver node 26, and a plurality of intermediate nodes 24.

The provider node 22 and the receiver node 26 need not be the original source of the data or the eventual destination of the data. In this case, the originating source of the data is shown to be at node 20 which is outside the network 21, and the intended eventual destination of the data is shown as being at node 27, also outside the network 21. The only distinguishing features of a provider node and a receiver node relate to the fact that a receiver node sends feedback to a provider node which includes path characterization information.

In between nodes are individual communication channels 23, 29 via which data can be communicated. For the purposes of explaining this embodiment, channels which link nodes which take a role in communicating data from the provider node 22 to the receiver node 26 will be referred to as hops 23. Between the provider node 22 and the receiver node 26, a variety of alternative paths may be taken, in which case other ones of the communication channels 23, 29 would be regarded as hops 23 on the path.

In the IPv4 header, two fields are used to characterize the path, the TTL and the ECN fields (certain options such as a "timestamp" option were also designed for this purpose). An embodiment of the invention that aimed to characterize the path against hop count and congestion metrics may require modifications to the standards for handling IP headers. Therefore, the IP version field might be set to some future version, say eight. We will describe the embodiment using a new "Explicit Congestion Level" (ECL) field consisting of an 8 bit real number replacing the two bit ECN field (how this fits into the header need not concern us here). The TTL field could remain the same size, but both TTL and ECN fields will be used differently from their standardized semantics in IPv4. As will be understood from the explanation below, such an ECL field will be capable of providing path characterization information to any node, such path characterization information providing information from upstream of the node in question which is indicative of the amount of congestion likely to be experienced on a path downstream of the node in question by a data packet at the node in question.

When providing a first data packet, the provider node 22 assigns values to various fields in a header associated with that data packet, which may include any or all of the fields explained above with reference to the Internet Protocol IPv4 with alterations similar to those just described. The provider node 22 assigns an initial value to what will be referred to as the "path characterization metric". As will be explained, the semantics of the path characterization metrics differ from those of the IPv4 header in a fundamental way, which is that the common reference level of the path characterization metric is arranged to sit at the receiver node 26, rather than the provider node 22.

In order to explain this difference, reference will again be made briefly to the "time-to-live" (TTL) field in the Internet Protocol header. As explained earlier, this is currently initialized at the sender with a value of 255, and is decremented by every node that each packet traverses. Thus, at any node in the network, the difference (255-TTL) characterizes the number of upstream hops that a packet has traversed. If the packet reaches its intended destination after 45 hops, the TTL value will have been decremented to 210, and will have served the purpose of indicating to intermediate nodes on the path that the packet had traversed no more than 45 hops. If, however, the packet was incorrectly routed and/or entered a loop such that it performed sufficient hops (i.e. 255 hops) for the TTL value to reach zero, this would indicate to a subsequent intermediate node that the packet could be discarded. In this event, an indication may be sent to the provider node that the packet failed to reach its destination, but subsequent packets would still be assigned an initial TTL value of 255.

Contrary to this, a path characterization metric corresponding to the TTL field would be assigned an initial value by the provider node 22 such that if the packet traverses the same or a similar path on a subsequent occasion, and every intermediate node 24 on the path decrements it by one, it should end up at a predetermined common reference level of, for example, zero at the receiver. In order to achieve this, the receiver node 26 should feed back the difference between the actual received value of the path characterization metric, and the predetermined common reference level at the receiver (e.g. zero) to the provider node 22. The provider node 22 can then adjust or correct the initial value of the path characterization metric in relation to future packets to the same destination so that packets should generally arrive at the receiver node 26 with a value of or near zero. It will be noted that the first packet sent, or other packets sent before any feedback is received are unlikely to hit the zero target, and may accordingly be flagged as "guess" packets. Once feedback relating to a "guess" packet has been received by the provider node and used to adjust or correct the initial value of the path characterization metric in relation to a subsequent packet, the value of the metric, as updated by subsequent intermediate nodes 24 in respect of hops traversed by the packet, will convey information to each subsequent intermediate node that relates to remaining number of hops to the destination, i.e. the "downstream path" in respect of node.

With this new arrangement, any node in the network (whether provider 22, intermediate 24 or receiver 26) can read the value of the path characterization metric in any "non-guess" packet as the predicted remaining number of hops to the destination, albeit one round trip time ago.

An important, if not fundamental advantage of using path characterization metrics such as the above in the above manner will now be explained with reference to the "routing" of data packets through a network. As will become apparent, embodiments of the present invention allow intermediate nodes, taking the role of Internet routers, for example, to make informed decisions with regard to the onward routing of packets they receive, based on information relating to the dynamic state of the downstream path to the destination (i.e. the path between the intermediate node in question and the intended receiver). They are able to do this without the need for upstream routing messages along the path in use other than those from the eventual receiver node back to the provider node. Previously, according to IPv4, routing messages have been passed upstream between intermediate nodes typically every 30 seconds. With use of a path characterisation metric as set out above, and without the need for such upstream routing messages, the changing state of the downstream path may be known almost continuously (albeit delayed by one round trip). Even at nodes where no data is currently destined for a particular destination, explicit additional routing messages need only be sent from nearby nodes that are being continuously updated. Thus, routing can continuously adapt and converge to downstream changes, without the need to wait for regular routing updates from the path in use. These advantages are applicable to improving routing convergence and efficiency in a variety of types of network, but this advantage is of particular relevance in relation to more dynamic scenarios such as where there is network mobility or in an ad hoc network, or where a more dynamic metric such as congestion as well as more stable metrics such as hop count are used to optimize routing.

Generally, the purpose of an Internet routing protocol is to maintain a "routing table" on, or in relation to any node that may act as a router. This allows data packets carrying any destination address to be forwarded via the correct interface. An objective of a routing protocol is to ensure that the routing table is as up-to-date as possible. It is advantageous if this can be done without requiring an unduly large volume of routing update messages between all the routers.

Referring to FIG. 3, a simplified representation of a network is shown in order to illustrate how embodiments of the invention allow for the provision of path characterization information to nodes which allows them to make informed decisions relating to the routing of data through the network.

FIG. 3 indicates how routing decisions may be made using path characterization information derived according to embodiments of the present invention. It shows how such path characterization information may be exploited to route information towards a receiver by the "best" possible route. The word "best" seems to imply that the choice is subjective, but the sense in which the route is seen as the best can be chosen by selecting a metric corresponding to any of a variety of categories. Depending on the category of metric used, "best" may thus correspond to "cheapest", "least-congested", "most direct", or "least propagation delay" etc., or even a weighted combination of these. In order to simplify the explanation, we will consider the routing of data based on just one type of path characterization metric, "propagation delay", for example. In this case, it will be assumed that a "propagation delay" field exists in the data headers of the network protocol in use.

As will be understood, the selection of the "best" route (according to the chosen perception of "best") is made possible because downstream traffic brings information about the conditions for sending information further downstream to the receiver.

In FIG. 3, senders S1 to S4 (squares) represent possible provider nodes, which may be single hosts or other networks from which data may be sourced. Receiver R1 represents a receiver node. Routers RT1 to RT6 (large circles) represent possible intermediate nodes on the path from a sender to a receiver. Each interface of each router is shown (smaller circles) holding the link cost of its locally-connected downstream link $\Delta m_i$. Where two possible interfaces exist and a choice may need to be made between them, the link costs of the respective downstream links are shown in respective small circles. Using the example of propagation delay, this can be measured by a simple echo request along each link (whether wired or not) at boot, for example. For fixed links, a re-measuring of this delay may be triggered if the underlying logical link changes its topology, for example. For wireless links, it may be appropriate to measure propagation delay more regularly, depending on the likelihood of mobility.

As each router accepts data, it decrements the "propagation delay" field by the propagation delay $\Delta m_i$ of the link the data was sent over. For simplicity, the target value $m_z$ for the "propagation delay" field will be taken to be zero in this example. Then according to embodiments of the present invention, after the first round-trip, further data packets flowing towards receiver R1 at every router may carry a "propagation delay to destination" (PDTD) value $m_i$ in their headers which represents what the remaining delay to R1 was on the last round-trip. This is represented by the "in-data headers" (numbers in heads of large numbered arrows), and may be treated by routers as a Path Characterization Metric (PCM). Routers may thus maintain the PDTD values for one, two, or more interfaces in their internal routing tables (see numbers inside large circles). Where two (or more) values are held, each router need only "advertise" its single "least-cost" or "best" route to its neighbors, but where a router may itself need to make a choice between the different interfaces, it may do this at any time simply by comparing the "least-cost" route with the "next least cost" route, or (in other terms) by comparing the "best" route with the "next best" route, at any time.

Routing messages, using a protocol similar to the current "Routing Information Protocol" (RIP) and containing PDTD values for R1 may be sent regularly from routers outwards from R1, every 30 seconds for example, unless a change triggers an immediate message. These are shown as numbers inside black arrows. These routing messages may, however, be suppressed where data is flowing along a link towards R1, since path characterization information may then be provided instead according to the invention.

(A) Suppose firstly that sender S1 sends a regular information flow to R1. The initial value for each packet is set at PCM=7, and it arrives at destination R1 with a value of PCM=0. The intermediate node RT1 can learn from the PCM of the packets directed to R1 that the link cost between RT1 and R1 is PCM=7. The PCM field is decreased by 4 (i.e. 4 being the link cost between RT1 and RT5. This value may be proportional to the congestion of RT1 on that link, or to the propagation delay that has been established in respect of the link in question, for example). The packet is then forwarded to RT5 with PCM=(7−4)=3, and RT5 forwards this information to R1 decreasing the PCM by 3 (3 is the link cost between RT5 and R1).

It is important to note that once Router RT1 learns that the path cost (i.e. the result of combining individual link costs) between RT1 and R1 is PCM=7, this information can then be sent to the router RT2, RT5, RT6. The smaller numbered arrows represent "in route messages", which may be implemented by whatever means is most appropriate, depending on the protocol chosen, in order to broadcast the path cost between nearby routers.

(B) Suppose that senders S3 and S4 send a regular information flow to R1. This would allow routers RT3 and RT4 to discover that their path costs to R1 are 6 and 3 respectively. It is important to note that RT3 would forward traffic to RT4 rather than RT6 because the link-cost between RT3 and RT4 is 3, which is lower than the cost between RT3 and RT6, which is 8. For the same reason RT4 would forward information directly to R1 instead of via RT5.

Again, it is important to note that Routers RT3 and RT4 learn that the path costs between them and R1 are PCM=6 and PCM=3 respectively. This information may again be sent to nearby routers using "in route messages".

(C) Suppose that Sender S2 sends a regular flow to R1. The initial value for each packet is PCM=7 and it arrives at the destination R1 with a value of PCM=0. It is important to note that RT2 would send the information via RT3 and not via RT1 because the "cost" is lower.

The use of path shar-asterisatien characterization information together with some routing messages from the routers nearby allows the cost from the router to the destination to be discovered in almost real-time (i.e. delayed by only one round trip time (RTT)). This method allows faster convergence compared to current routing protocol.

Before explaining the concept of path characterization metrics further, it should be noted that while the above path characterization metric appears to correspond in some ways to the TTL value in the IPv4header, it differs fundamentally from this on account of the fact that the path characterization information used as feedback is effectively normalized with respect to the receiver rather than the sender. This fundamental difference will be more clearly evident in relation to other embodiments of the invention which may involve path characterization metrics corresponding to any of a variety of other header values or other characteristics associated with data packets, adapted by applying the above change of reference point to those values or other characteristics in order that they characterize the "downstream path" (i.e. from any node on the path in question) through the network rather than the "upstream path", which is what is characterized by metrics such as the traditional TTL value. A non-exclusive list of possible candidates which could be used in association with embodiments of the invention follows, together with brief comments on each candidate:

1) Propagation delay: an ideal metric for determining optimal routes to destinations
2) Congestion delay: the queuing delay currently being introduced due to congestion
3) One way delay: the sum of queuing and propagation delay on the downstream path
4) Hop count: as discussed above, a simple and pragmatic integer approximation to propagation delay used for routing
5) Congestion shadow price: The probability that a current packet will cause any other packet to fail to achieve its required level of service (e.g. cause a low latency packet to arrive too late, or a best effort packet to be dropped etc.)
6) Explicit Congestion Notification (ECN): a pragmatic approximation to the congestion shadow price
7) Available capacity: the minimum spare capacity available on any downstream node
8) Loss-rate: the probability that the current packet will be dropped before reaching its destination
9) Error-rate: the probability that the current packet will be corrupted before reaching its destination (mainly distinguishing losses on wireless links due to fading etc, from congestion losses)
10) Downstream service availability: Previously, when upgrades have been made to inter-network services and the protocols used to request them, it has not been possible to know whether all nodes on a path between two end-points are capable of supporting a new service. Embodiments of the present invention allow introduction of a solution to this problem.

Those metrics from the above list that would be necessary and sufficient to operate a simple but complete network service will depend on the type, size and complexity of the network required. The list could include path characterization metrics corresponding to propagation delay, congestion shadow price and error rate, for example.

Specific embodiments of this invention may use fields already existing in current protocol headers (for instance the eight-bit TTL field for the hop count or the two-bit ECN field for the congestion shadow price in IPv4 packets), or may require the introduction of new fields for metrics already in use that are better suited to effectively run what we will refer to as the "re-feedback" mechanism (for instance a larger shadow price congestion field in IPv6 packets, with a size of eight or maybe 32 bits if necessary), or may require the introduction of new fields suitable for metrics currently not handled at all (for instance a field for propagation delay in IPv6 packets).

Where the path characterization metric corresponding to the TTL value or hop-count would in general be decremented in relation to each hop traversed, other mathematical functions may be appropriate in relation to other metrics. Typical ways that the above metrics could be combined between all downstream nodes include the following:

1) Sum( )
2) Difference( )

3) Max( )
4) Min( )
5) Logical AND( )
6) Logical OR( )
7) Combinatorial product( )
8) Combinatorial quotient( )

Each path characterization metric m is represented by a header value h. The header value would in general be combined across all the nodes on a path with the most useful function, for instance, one of the functions listed above. Logical AND( )may be the most appropriate for "Downstream Service Availability", Min( ) for "Available Capacity", Combinatorial product( )for "Congestion shadow price", Difference for "Unloaded delay", etc.

With reference to FIG. 4, a graph is shown illustrating the use of a path characterization metric based on the Explicit Congestion Level (ECL), by way of example.

A path across a network consisting of a sequence of nodes $(v_0, v_1, \ldots v_i, \ldots v_n)$ is represented, with source $v_0$ and destination $v_n$. Rather than a single bit to notify congestion, a metric "m", used in an Explicit Congestion Level (ECL) multibit field "h" in the network layer header of all data packets is used in this example. This field should be wide enough to represent a reasonable number of discrete values, both positive and negative. Value $m_i$ represents the value of the field before processing by the $i^{th}$ node. It is updated at each node according to a combining function f(.) common to all the nodes $h_{i+1}(t)=f(h_i(t), m_i(t))$ where $m_i(t)$ is the local contribution to the end-to-end path characterization metric. $m_i(t)$ may, for instance, be a known value relative to the single downstream link e.g. the unloaded delay), or reflect some dynamic condition of the node e.g. the local congestion level could be given as the dropping probability of the RED algorithm).

A reference value $h_z$ is defined for each metric as the target for the header field at the destination. In FIG. 4, $h_z = 0$ for simplicity. Considering now the first of a "flow" of packets (step (1), circled, in FIG. 4), the sender or provider (22 in FIG. 2) should estimate an initial value for the ECL, $h_0$, to place in the packet and store this value. After transmission over the path, the ECL arriving at the destination will be $h_n$.

The receiver (26 in FIG. 2) then feeds $h_n$ back to the sender using a relevant end-to-end protocol above the network layer (step (2), circled). When this feedback arrives at the sender, any discrepancy between $h_n$ and $h_z$ will require the sender to adjust the initial value it sets the header field to in the data packets it sends. The constraint for $h_n$ to reach $h_z$ at the destination gives the definition of the source initialization function g(.) so that $h_0(t+T)=g(h_n(t), h_z, f(.))$. Note that this adjustment occurs one round-trip time after the packet last acknowledged was sent.

The sender can therefore adjust the rate at which it sends subsequent packets according to a congestion control algorithm (see later). The sender can also adjust its estimate of the initial ECL to use for the next packet sent over this path to $m_{0(1+T)}=m_{0(t)}-m_{f(t)}$, to try to ensure that the ECL will have dropped to exactly zero by the time it reaches the destination (step (3), circled).

For this next packet and all subsequent packets, if the path congestion remains unchanged, $h_n=h_z$. However, if the path congestion changes, $h_0$ will have to be updated again the following round-trip-time in order to ensure that the ECL field is still zero when it arrives at the destination. The sender may predict its initial ECL estimate for subsequent packets based on recent feedback from previously sent packets, in order to ensure $h_n$ continues to approximate to zero. Irrespective of this, however, it will be seen that the above process already goes a considerable way towards achieving an important objective: values of $h_i$ at any point on the path can always give an indication of the metric downstream of that point, albeit one round-trip time late. To do so, a network node on the path of a flow may use the downstream path metric extraction function j(.) to get an estimate of the metric on the downstream path of each packet: $\tilde{m}_i(t)=j(h_i(t), h_z, f(.))$ Examples of these three functions are given in Table 1 for different combining functions.

TABLE 1

Definition of required functions to implement "re-feedback" for different types of combining function

| Combining function $h_{i+1}(t) =$ | Difference $h_i(t) - m_i(t)$ | Combinatorial product $1 - (1 - h_i(t)) \cdot (1 - m_i(t))$ | Combinatorial quotient $1 - \dfrac{(1 - h_i(t))}{(1 - m_i(t))}$ |
|---|---|---|---|
| Source initialization function $h_0(t + T) =$ | $h_0(t) - h_n(t) + h_z$ | $1 - \dfrac{(1 - h_0(t))}{(1 - h_n(t))} \cdot (1 - h_z)$ | $1 - (1 - h_O(t)) \cdot (1 - h_n(t))$ |
| Downstream path metric extraction function $\tilde{m}_i(t) =$ | $h_i(t) - h_z$ | $1 - \dfrac{(1 - h_z)}{(1 - h_i(t))}$ | $h_i(t)$ |
| Metric for which it is useful | Unloaded delay | Congestion | |

It will be noted that to rely on these values it is necessary to ensure that everyone (or every node) in the feedback loop has the incentive to be truthful. The issue of incentives is discussed below.

In view of the above, further important advantages of using path characterization metrics such as the above in the above manner will now be explained with reference to congestion charges, and incentives to act in good faith when providing network status information to other parts of the network. These are as follows:

1) Correct reaction to congestion previously depended on all end-nodes voluntarily complying with standard algorithms. Solutions have been developed in which a price is applied to Explicit Congestion Notification data in packets, giving an incentive to behave responsibly. However, these solutions rely on charging the destination, and expecting it to have a trust relationship with the source in order to encourage correct source behavior. This has opened the possibility of destinations being subjected to malicious attacks from sources that could force their "victims" to pay congestion charges outside their control. Embodiments of the present invention allow sources to be charged directly for congestion on the downstream path, because information indicative of this is available at the interface between the source and its provider, rather than only at the destination. This also gives the correct incentives and local up-to-date information for inter-connect congestion charging and routing. Currently, each receiving network would have to pay its immediately upstream network in proportion to the number of packets with the congestion experienced code point set in the ECN field. But a downstream network has upstream congestion information but cannot choose who routes to it, and the upstream network doesn't have downstream congestion information but can choose to whom it routes. So downstream networks would have to pay congestion charges to upstream networks whether they would have chosen to have received traffic from them or not.

2) When starting a new flow over a new path, embodiments of the invention provide the correct incentives to proceed cautiously until sufficient feedback has been received. Currently, Internet Protocols require voluntary compliance with congestion control initialization algorithms in case the path to be used is close to or already in a state of congestion. Such controls lead to conservative behavior, wasting transfer time when a path is in fact nowhere near being congested, which will become a considerable problem in the future if most objects transfers are complete before feedback from the first packet has arrived. Such controls are also open to abuse, with nodes having an incentive to ignore them for "selfish" reasons. Embodiments of the present invention allow for the risk of lack of knowledge of a path's state to be reflected in the shadow price charged, which may either be realized as an actual congestion charge, or as a deprioritization of the traffic carrying the higher shadow prices. It also allows for the correct incentives to be given for intermediate nodes to aggregate numerous flows, each of which separately have no knowledge of the path state, but which can be treated collectively to learn the likely path state for a new flow from the path state recently learned from an old flow.

At this stage we can highlight an important point about the congestion level reported in the initial packets in a flow sent without the benefit of any feedback. Although we have already recommended that these values should be flagged as guesses, we still recommend that they should be treated individually just like any other packets. That is, if their downstream congestion level $m_{zi}$ consistently drops below zero, a policing system should penalize (drop) them irrespective of their 'guess' status. So the sender will have to overstate the initial shadow price $m_{z0}$ to ensure such packets have contingency to travel the full length of their unknown path. But the over-stated shadow price they carry $m_{zi}$ should entitle them to a lesser share of any congested resources, assuming it is higher than other packets of the same class. This effectively enforces a behavior like the slow start phase of TCP until the path has been correctly characterized. Such a harsh regime ensures that the risk of entering an unknown path is borne by the new flow, rather than spread across other flows it encounters.

3) Because knowledge of the downstream path can be available in the network layer header information of downstream data traversing the network, intermediate nodes can use it in order to act as a congestion control proxy for the provider. A specific differentiated services gateway has been invented, which can selectively deprioritize and eventually drop the traffic most likely to experience (and therefore cause) congestion on its active downstream paths. Previously, the information required by a proxy was in feedback data passing end to end upstream from destination to source, often on a different path from the downstream flow. Hence proxies found it difficult to access this information, because there was no guarantee they were even on the path of the data. Where such proxies were in use, they were also required to understand all possible higher layer feedback protocols, effectively constraining the introduction of new protocols. Embodiments of the present invention allow for relevant information to be kept at the right layer, in the right direction and therefore on the right path.

The above discussion relates in general to how embodiments of the present invention allow for solutions of the first of the two general problems set out above, relating to the provision of information characterizing the downstream path to be made available to every node. An explanation will now be given as to how embodiments of the present invention allow for the solution of the second of the two general problems set out above, namely how to proof this information against falsification.

Proofing Path Characterizing Information Against Falsification

For the following, the explanation will be given with reference to a specific metric, namely a path characterization metric based on a Congestion Notification field of a future network protocol. In relation to this explanation, it will be assumed that congested nodes decrement the value of the metric by a value indicative of their current level of congestion. A system can be foreseen in which each node sending data along a path (noting that all intermediate nodes, when forwarding data, act in effect both as senders and receivers) pays for the level of congestion it forwards on in sent traffic, and each receiver is paid for the level of congestion in the traffic it receives (except the ultimate receiver—see later). In such a system, intermediate nodes may collect revenue according to the level that they decrement the congestion field in each packet as "congestion charges", and they have an incentive to route packets along the least congested and hence cheapest downstream path. Each intermediate node may also run a policing algorithm that probabilistically drops packets if their congestion level has decremented below zero, zero being the agreed target level in this case. Dropping algorithms will be discussed later.

In such a system, different incentives apply to different nodes depending on what role they are taking in the communication of data from provider to receiver. These incentives would apply as follows:

Incentives for the Provider Node:
  The provider node has an incentive not to over-declare congestion, otherwise it will have to pay too much.
  The provider node also has an incentive not to under-declare congestion, otherwise packets it sends may well be dropped before they reach their destination.

Incentives for Intermediate Nodes:
  Intermediate nodes have no incentive to decrement the congestion level less than is actually being experienced—this would be likely to lead to worse congestion and would deny the nodes themselves revenue from congestion charges.
  Intermediate nodes have no incentive to decrement the congestion level more than is actually being experienced, as they cause upstream congestion control algorithms to reduce otherwise revenue carrying traffic towards them and will also risk losing their traffic to competing routes.

Incentives for the Receiver

At first sight, it may seem that receivers are able to over-declare congestion in their feedback in order to cause their correspondent provider to pay too much in congestion charges, but this will tend to cause the sender to slow down its rate, which is not in the interests of the receiver.

Receivers have no incentive to under-declare congestion in their feedback, as this will cause future traffic to be dropped before it reaches them.

Dropping Algorithms

An example of a dropping algorithm is outlined with reference to FIGS. 5, 6 and 7. In overview, it first measures the current moving average level of congestion in packets to a destination. It also either measures the current variance of the level, or uses a fixed value found to be typical from operating experience. This measured mean is used as a parameter to determine the probability that any particular packet will be dropped. If the mean is positive or zero, no packets will be dropped. If the mean is negative, a packet with a negative value will be dropped with a probability given by the dropper's probability distribution. The more negative the level of congestion in any particular packet, the greater the chance it will be dropped. The more negative is the mean, the stricter the dropping policy is.

It is well known that dynamically-priced tariffs such as congestion charging are not popular with customers, as they lead to unpredictable charges. A congestion control gateway that brokers the risk of variable pricing may be used. It would sit downstream of a sender, absorbing the risk of congestion pricing on the sender's behalf. It would buffer and eventually drop packets destined for the most congested downstream paths if the accumulated regular income it receives from the sender drops below the variable congestion charge it has to pay to its downstream inter-connect provider. Thus it would offer a constant level of service at a constant price, except during extreme sustained levels of congestion when it would degrade the service, keeping the price constant per unit time.

Other gateways offering different tariffs or service contracts may generally be much easier to design if feedback according to an embodiment of the invention is used, because downstream path knowledge is available at the point of control where the gateway is sending.

What is claimed is:

1. An intermediate node for controlling the treatment of data packets traversing an already established path across a data network from a provider node to a receiver node, each said node including at least one configurable data processor coupled to memory and input/output circuits,
    the data network comprising said intermediate node, at least one upstream node located upstream from said intermediate node, said provider node being an upstream node, and a plurality of downstream nodes located downstream from said intermediate node, said receiver node being one of said downstream nodes,
    at least one of the upstream nodes being configured to provide data packets to said intermediate node via at least a portion of the path between the provider node and the intermediate node,
    at least one of the upstream nodes also being configured to provide path characterization information to said intermediate node via said at least a portion of the path between the provider node and the intermediate node, said path characterization information being indicative of a state of a dynamic path characteristic which is changeable as the data packets traverse the path,
    currently received instances of said path characterization information being dependent on information previously fed back from the receiver node to the provider node based on at least one prior instance of path characterization information that was modified as a function of an actual downstream path characteristic encountered during its prior transmission from the provider node to the receiver node along a downstream portion of the path from the intermediate node, and
    said downstream nodes being arranged to receive said data packets via respective downstream portions of paths between the intermediate node and the receiver node;
    said intermediate node comprising:
    an input circuit configured to receive data packets from an upstream node;
    a data processor configured to receive path characterization information from an upstream node, and for deriving therefrom information representing an actual characteristic of at least a portion of the downstream path between the intermediate node and the receiver node;
    said data processor also being configured to locally control selection at said intermediate node, in dependence on said derived information representing said actual characteristic of at least a portion of the downstream path, a preferred manner of future treatment for data packets to be forwarded onward downstream from the intermediate node towards the receiver node; and
    an output circuit configured to forward data packets to a downstream node according to said locally selected preferred manner.

2. An intermediate node according to claim 1, wherein the selection of a preferred manner of treatment for data to be forwarded on a downstream path relates to selection of a preferred downstream path.

3. An intermediate node according to claim 1, wherein the selection of a preferred manner of future treatment for data packets to be forwarded onward downstream towards the receiver node is based at least in part on one or more of the following:
    (i) traffic engineering;
    (ii) route advert verification;
    (iii) contract verification;
    (iv) differentiated service gateways.

4. An intermediate node according to claim 1, wherein the data packets provided to said intermediate node comprise said path characterization information.

5. An intermediate node according to claim 1, the data network comprising a data channel for the forwarding of data packets between nodes and a control channel for providing path characterization information to the intermediate node, wherein the upstream node arranged to provide data packets to said intermediate node is a node of the data channel, and the upstream node arranged to provide path characterization information to said intermediate node is a node of the control channel.

6. An intermediate node according to claim 1, wherein the intermediate node shares computational resources with an upstream or a downstream node.

7. An intermediate node according to claim 1,
    wherein the at least one data processor configured to locally control selection of a preferred manner of treatment for data packets to thereafter be forwarded is configured to select a preferred downstream node; and
    wherein the data processor and output circuit configured to forward data packets according to said preferred manner are configured to thereafter forward data packets to said preferred downstream node.

8. A method for controlling the treatment by an intermediate node of data packets traversing an already established path across a data network from a provider node to a receiver node, each said node including at least one configurable data processor coupled to memory and input/output circuits, the data network comprising said intermediate node, at least one upstream node located upstream from said intermediate node, said provider node being an upstream node, and a plurality of downstream nodes located downstream from said intermediate node, said receiver node being one of said downstream nodes, at least one of the upstream nodes being configured to provide data packets to said intermediate node via at least a portion of the path between the provider node and the intermediate node, at least one of the upstream nodes also being configured to provide path characterization information to said intermediate node via said at least a portion of the path between the provider node and the intermediate node, said path characterization information being indicative of a state of a dynamic path characteristic which is changeable as the data packets traverse the path, currently received instances of said path characterization information being dependent on information previously fed back from the receiver node to the provider node based on at least one prior instance of path characterization information that was modified as a function of an actual downstream path characteristic during its prior transmission from the provider node to the receiver node along a downstream portion of the path from the intermediate node, and said downstream nodes being arranged to receive said data packets via respective downstream portions of paths between the intermediate node and the receiver node;

said method comprising at said intermediate node:

receiving data packets from an upstream node;

receiving path characterization information from an upstream node, and deriving therefrom information representing an actual characteristic of at least a portion of the downstream path between the intermediate node and the receiver node;

locally selecting, in dependence on said derived information representing said actual characteristic of at least a portion of the downstream path, a preferred manner of future treatment for data packets to be forwarded onward downstream from the intermediate node towards the receiver node; and forwarding data packets to a downstream node according to said locally selected preferred manner.

9. A method according to claim 8, wherein the step of locally selecting a preferred manner of treatment for data packets to be forwarded further downstream from the intermediate node comprises selecting a preferred further downstream path.

10. A method according to claim 8, wherein the step of locally selecting a preferred manner of future treatment for data packets to be forwarded onward downstream towards the receiver node is based at least in part on one or more of the following:

(i) traffic engineering;
(ii) route advert verification;
(iii) contract verification;
(iv) differentiated service gateways.

11. A method according to claim 8, wherein the data packets provided to said intermediate node comprise said path characterization information.

12. A method according to claim 8, the data network comprising a data channel for the forwarding of data packets between nodes and a control channel for providing path characterization information to the intermediate node, wherein the upstream node arranged to provide data packets to said intermediate node is a node of the data channel, and the upstream node arranged to provide path characterization information to said intermediate node is a node of the control channel.

13. A method according to claim 8, wherein the intermediate node shares computational resources with an upstream or a downstream node.

14. A method according to claim 8, wherein the locally selecting step comprises selecting a preferred downstream node; and wherein the forwarding step comprises thereafter forwarding data packets to said preferred downstream node.

* * * * *